United States Patent [19]
Henze et al.

[11] 3,967,405
[45] July 6, 1976

[54] TROLLING APPARATUS

[75] Inventors: Walter J. Henze; San Thein, both of Philadelphia, Pa.

[73] Assignee: Penn Fishing Tackle Mfg. Co., Philadelphia, Pa.

[22] Filed: May 5, 1975

[21] Appl. No.: 574,382

Related U.S. Application Data

[63] Continuation-in-part of Ser. No. 556,552, March 10, 1975.

[52] U.S. Cl. .................................. 43/27.4; 43/24
[51] Int. Cl.² .................. A01K 91/02; A01K 87/04
[58] Field of Search ............................. 43/27.4, 24

[56] References Cited
UNITED STATES PATENTS

| | | | |
|---|---|---|---|
| 2,113,707 | 4/1938 | Montgomery et al. | 43/24 |
| 2,652,654 | 9/1953 | Bahn | 43/24 |
| 3,303,595 | 2/1967 | Wells et al. | 43/24 |
| 3,614,016 | 10/1971 | Rieth | 43/27.4 |
| 3,844,058 | 10/1974 | King | 43/27.4 |

*Primary Examiner*—Warner H. Camp
*Attorney, Agent, or Firm*—Zachary T. Wobensmith, 2nd; Zachary T. Wobensmith, III

[57] ABSTRACT

A line from a reel passes over a pulley and through a bracket mounted on a boom which extends outwardly from a base, the bracket carrying a bushing which can engage a stop piece on the line. The pulley is mounted on a sleeve support carried by a plug member on the boom, the support being rotatable with respect to the boom. The bracket can swivel on the pulley support and the pulley and its support can turn with respect to the boom in response to change of direction of the line.

6 Claims, 4 Drawing Figures

U.S. Patent    July 6, 1976    3,967,405
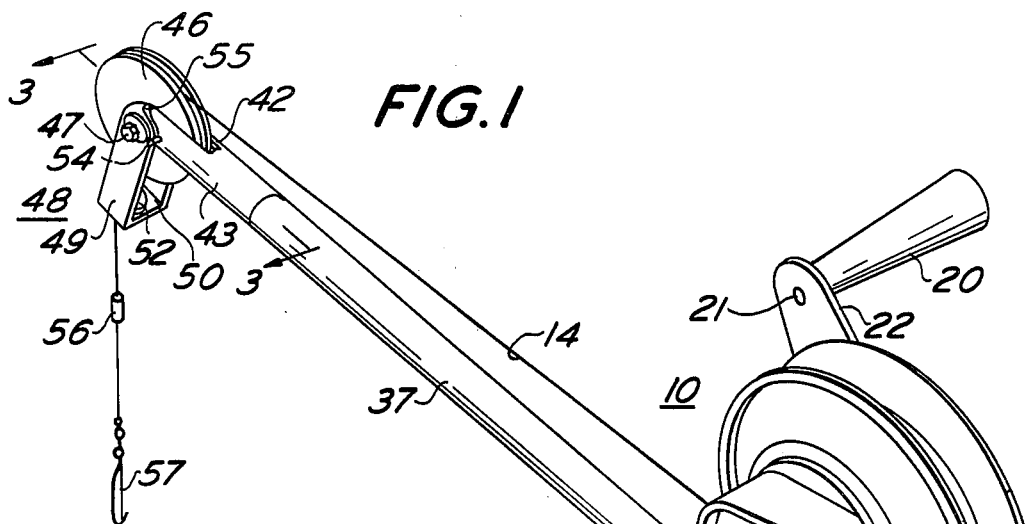
FIG. 1
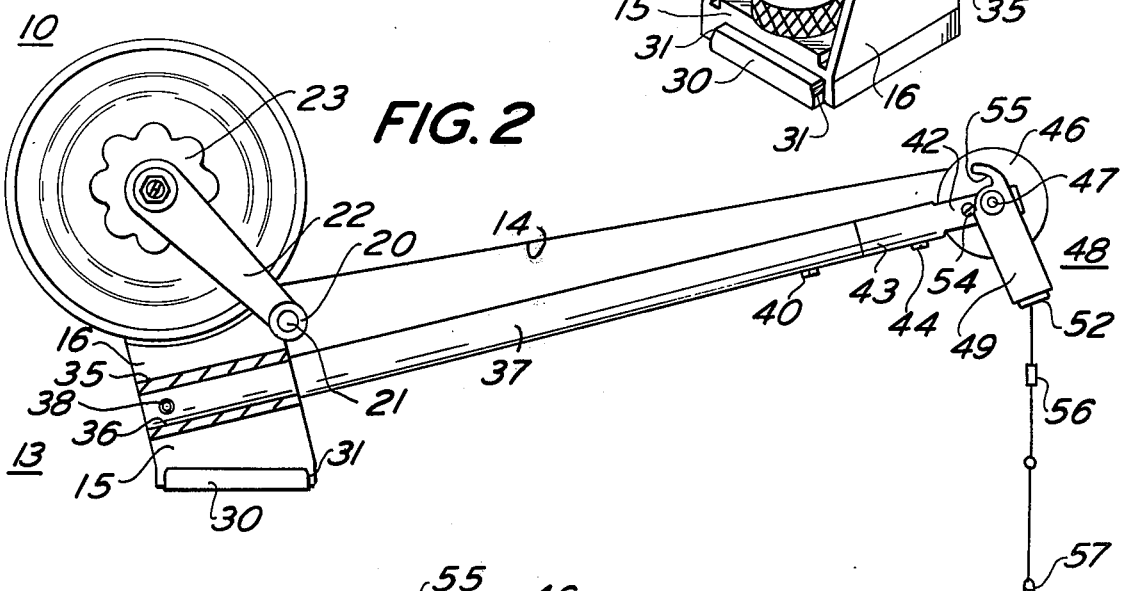
FIG. 2
FIG. 3
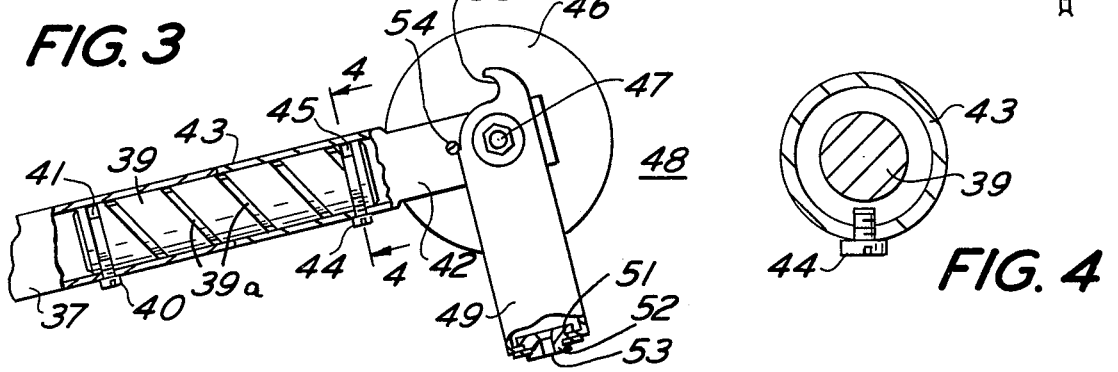
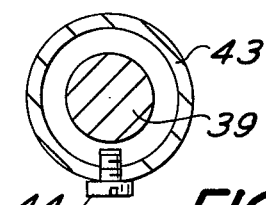
FIG. 4

3,967,405

TROLLING APPARATUS

Cross Reference to Related Application

This application is a continuation in part of our prior application for patent for Trolling Apparatus, filed Mar. 10, 1975, Ser. No. 556,552.

BACKGROUND OF THE INVENTION

1. Field of the Invention

This invention relates to a trolling apparatus of the reel and boom type for measured controlled depth trolling.

2. Description of the Prior Art

The experienced fisherman is well aware that fish seek water, of a particular temperature which varies with the type of fish. Water in the ocean as well as other bodies of water is at different temperature zones between the surface and the bottom.

When trolling for fish it is important that the bait be at the depth where the type fish which the fisherman seeks is likely to be feeding.

The desired temperature zone depth can be determined by trial and error or by using a temperature responsive device of well known type.

With previously available apparatus a heavy weight would be fastened to the end of line to which the fishing line hook with bait would be detachably secured. The weight and fishing line would then be lowered to the desired depth. When the fish struck the hook the line would detach from the weight and the fish would be pulled into the boat separate from the weighted line.

Heavy duty reels for attachment to a boat have heretofore been proposed. Wilson, U.S. Pat. No. 3,147,935, and Sylvester U.S. Pat. No. 585,059 show such a reel but their structures are unsuitable for trolling.

It has also heretofore been proposed as shown by Walker, U.S. Pat. No. 2,099,153, to provide a tape reel for measuring depth.

Thomas, in U.S. Pat. No. 3,417,502, shows a reel and rod for heavy load fishing but the line is not accommodated for shifting of position.

Rieth, in U.S. Pat. No. 3,614,016, shows apparatus for depth control fishing which includes a reel and a flexible arm which is held laterally in a fixed position so that the accommodation of the line at the end of the arm to shifting positions is greatly limited. The only control of the reel is by a locking pin engageable in apertures in the reel.

None of the previously available apparatus referred to above was suitable for fishing using the apparatus with a hook alone or with a weight and separate line. Such apparatus was awkward to operate, did not provide accurate measurement of the line payout and consequent depth of the weight and fishing hook and suffered from various other shortcomings including the likelihood of tangling the line with the boom or rod.

SUMMARY OF THE INVENTION

Trolling apparatus is provided which includes a base detachably mounted to a bracket fastened to the deck or transom of a boat, which base rotatably carries a large reel. The reel may be driven in one direction by a handle through a controlled variable drag mechanism. The line from the reel passes over a pulley carried on a pulley support rotatable with respect to the boom and through a bracket on the pulley support which has a bushing that acts with a stop carried on the line to prevent line entanglement with the pulley.

The principal object of the invention is to provide improved trolling apparatus which can be used for trolling with a separate hook and line or for fishing with its own hook. A further object of the invention is to provide a trolling apparatus which has increased freedom of the line at the free end of the boom.

A further object of the invention is to provide trolling apparatus utilizing a pulley for the line at the end of the boom with a guide bracket for the line, the pulley and guide bracket being mounted on a pulley support pivotally carried on the free end of the boom.

Other objects and advantageous features of the invention will be apparent from the description and claims.

DESCRIPTION OF THE DRAWINGS

The nature and characteristic features of the invention will be more readily understood from the following description taken in connection with the accompanying drawings forming part hereof, in which:

FIG. 1 is a perspective view of the apparatus of the invention;

FIG. 2 is a side elevational view of the apparatus of the invention;

FIG. 3 is a vertical sectional view, enlarged, taken approximately on the line 3—3 of FIG. 1; and FIG. 4 is a fragmentary vertical sectional view, enlarged, taken approximately on the line 4—4 of FIG. 3.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENT

Referring now more particularly to the drawings, the trolling apparatus includes a reel 10, preferably of moulded synthetic plastic, rotatably carried on a shaft 12, as shown in application Ser. No. 556,552, carried in a frame assembly 13.

The periphery of reel 10 is U-shaped for winding of line 14 onto and from the reel. The sides of the U-shaped perimeter of reel 10 slope inwardly and downwardly.

The frame assembly 13 includes a bottom plate 15, side plates 16, and front and rear connecting plate portions 17 and 18. The plates 15, 16, 17 and 18 are preferably integral and moulded of synthetic plastic in one piece.

The reel 10 is rotatable for winding line onto its periphery by a handle 20 rotatably carried on a shaft 21 at the end of an arm 22. The reel 10 may be controlled in any desired manner including an adjustable drag wheel 23 and may have a counter wheel 25 and pointer 26 such as is shown in application Ser. No. 556,552.

A block 30 is provided which may be permanently fastened to the deck or transom of a boat (not shown) in any desired manner such as by screws (not shown). The block 30 is rectangular in shape and may be provided with beveled side edges 31 for engagement with complemental surfaces on the bottom plate 15. A nut 32 engages a bolt (not shown) in the block 30 and detachably retains the frame assembly 13 in place but permits of quick removal when desired.

The frame assembly 13 has an integral cylindrical sleeve 35 thereon which receives the lower end portion 36 of reduced diameter of a hollow boom 37. The boom 37 is preferably formed of hollow aluminum tubing treated for corrosion resistance. The boom 37 can be detachably held in place by a pin 38.

The free end of the boom 37 has a pulley mounting plug 39 which can be of nylon and rotatably retained therein by a stud 40 the end of which extends into a groove 41 in the plug 39.

A sleeve 43, abutting the end of the boom 37 is retained on the plug 39 by a stud 44 extending into a groove 45 in the plug 39, the sleeve 43 being freely rotatable with respect to the boom 37. The sleeve 43 has spaced legs 42 extending therefrom between which a pulley 46 is mounted on a shaft 47 carried by the legs 42 for rotation. The shaft 47 also supports a U-shaped bracket 48 which has side plates 49 and a connecting plate 50.

The plate 50 is provided with a hole 51 which carries a bushing 52, preferably of stainless steel which is provided with a tapered hole 53 for passage of line 14 from the reel 10.

The plug 39 is provided thereon with shallow spiral grooves 39a the purpose of which is for self cleaning and drainage in friction areas of boom 37, plug 39 and sleeve 43.

Screws 54 are provided in each of the legs 42 which with hook like projections 55 of the side plates 49 restrict the swinging movement of bracket 48.

The line 14 can have a stop 56 thereon of cylindrical shape which when the line 14 is wound onto the reel 10 prevents the line and its attachments 57 from moving past the bushing 52 and jamming onto the pulley 10.

The mode of operation will now be pointed out.

Assuming that a supply of line 14 is wound onto the reel 10 and suitable attachments 57 are provided on the end of the line 14 and that trolling is desired, a weight (not shown) is attached to the attachments 57 and a fishing line (not shown) with hook (not shown) and quick release mechanism (not shown) is connected to attachments 57. The depth to which it is desired to troll is determined and the drag wheel 23 is rotated to release the reel 10 so that it freely rotates and line 14 is paid out to the desired depth.

When a fish strikes or when it is desired to raise the line 14 then the handle 20 may be rotated and line 14 wound onto the reel 10.

It will be noted that the pulley 46 is free to rotate upon winding or unwinding of the line 14 and that the pulley 46, the bracket 48 and the mounting including the sleeve 43 are free to turn or rotate about the longitudinal axis of the boom 37 as desired or required and without restraint.

The apparatus may be used for fishing without another line and hook by substitution of a hook and bait for the attachments 57 and the operation can proceed as described above.

The apparatus when used for fishing with its own hook is particularly useful when quick retrieval of the fish is desired with a minimum of effort.

It will thus be seen that apparatus has been provided with which the objects of the invention are attained.

We claim:

1. Trolling apparatus for fishing which comprises
   a base,
   a reel for a supply of line rotatably mounted on said base,
   a boom secured at one end to said base and having a hollow tubular free end,
   a pulley for said line, and
   means for mounting said pulley at said free end for pivotal movement about the longitudinal axis of said boom,
   said pulley being mounted on an axis transverse to the longitudinal axis of said boom,
   said means for mounting said pulley comprising
   a plug inserted in said hollow tubular free end and detachably retained therein,
   a sleeve on said plug and detachably retained thereon and rotatable with respect to said hollow tubular end,
   said pulley being rotatably mounted on said sleeve, and
   a pivotally mounted line guiding bracket carried by said sleeve, and
   said guide bracket being mounted on the same pivotal axis as said pulley.

2. Trolling apparatus as defined in claim 1 in which movement limiting members are provided for limiting the swinging movement of said bracket.

3. Trolling apparatus as defined in claim 1 in which said plug is freely rotatable with respect to said tubular free end.

4. Trolling apparatus as defined in claim 1 in which said sleeve is freely rotatable with respect to said plug.

5. Trolling apparatus as defined in claim 1 in which said plug is of self lubricating plastic material.

6. Trolling apparatus as defined in claim 1 in which said plug is provided with a shallow spiral groove for cleaning and drainage.

* * * * *